United States Patent [19]

de Pierre et al.

[11] 4,034,373

[45] July 5, 1977

[54] AIRBORNE MOVING-TARGET INDICATING RADAR SYSTEM

[75] Inventors: Richard de Pierre, W-Boxford; Gilbert Jerome Forgays, Lowell; Hans Heinrich Behling, Bedford; William Childs Curtis, Lexington, all of Mass.

[73] Assignee: RCA Corporation, New York, N.Y.

[22] Filed: Nov. 8, 1973

[21] Appl. No.: 413,808

[52] U.S. Cl. .............................................. 343/7.7
[51] Int. Cl.² ........................................... G01S 9/42
[58] Field of Search ................................. 343/7.7

[56] References Cited

UNITED STATES PATENTS

| 3,346,859 | 10/1967 | Mullins et al. | 343/7.7 |
| 3,594,800 | 7/1971 | Stoney | 343/7.7 |
| 3,775,768 | 11/1973 | Lisle et al. | 343/7.7 |

Primary Examiner—Malcolm F. Hubler
Attorney, Agent, or Firm—H. Christoffersen; Samuel Cohen; George J. Seligsohn

[57] ABSTRACT

Radar detects relatively low velocity moving ground targets having relatively tiny radar cross sections, although the radar itself is moving at relatively high velocity with respect to ground. This is achieved with the use of spectrum tracking means and range-gated filters incorporated in the radar detecting means.

16 Claims, 6 Drawing Figures

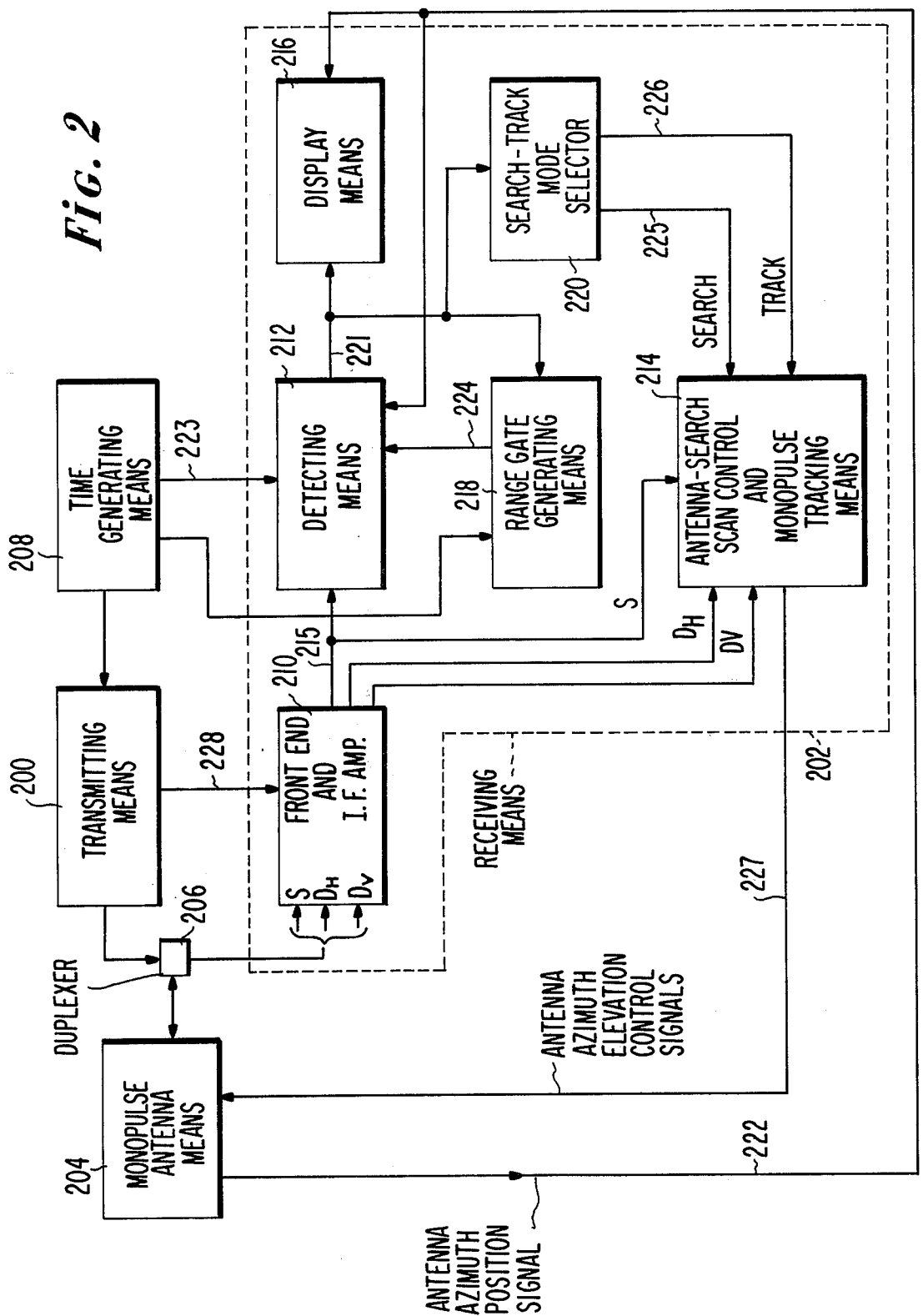

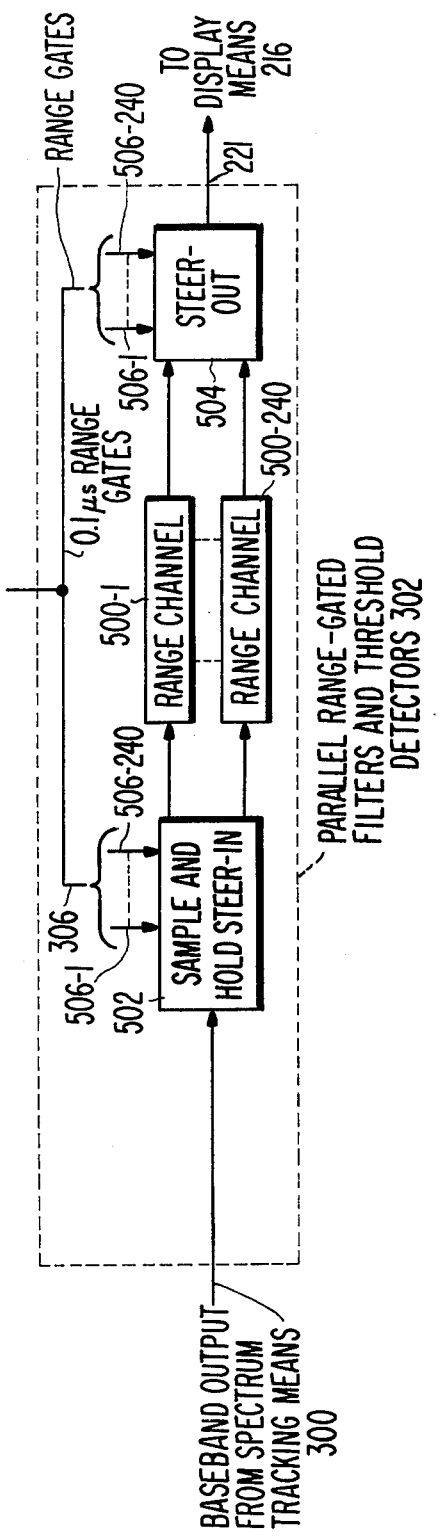
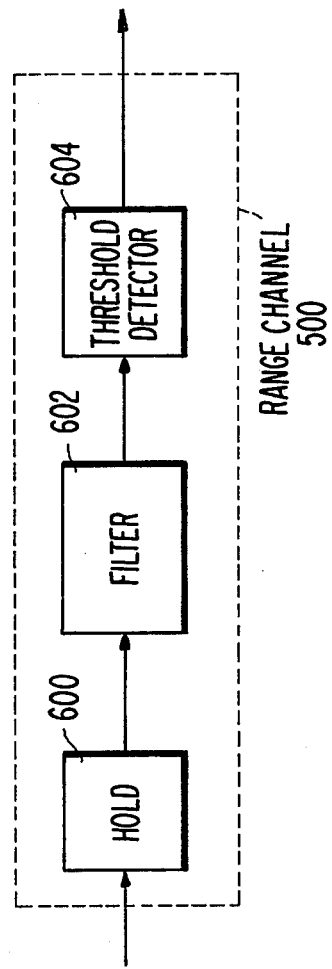

AIRBORNE MOVING-TARGET INDICATING RADAR SYSTEM

This invention relates to moving-target-indicating radar systems and, more particularly, to such a system located on a first body for detecting targets moving at a relatively low velocity with respect to a second body when the first and second bodies themselves are moving with respect to each other at a relatively high velocity.

Although the first body may be any type of craft including a spacecraft moving with respect to the earth or any other body, for illustrative purposes it will be assumed that the first body is an aircraft moving with respect to the ground and that the moving target is a relatively slow-moving object on the ground, such as a wagon, truck or other vehicle whose ground velocity is much less than that of the aircraft itself.

The problems in detecting such a slow-moving ground target with a radar aboard a fast-moving aircraft are formidable. The radar cross section of a typical moving target is tiny in size compared to the spot of ground illuminated at any given instant by a pencil beam of exploratory pulses of wave energy transmitted from an airborne radar system. The reflected pulse wave energy received by the radar, due to ground clutter determined by the scattering properties of the terrain illuminated by the radar antenna beam, comprises a wide spectrum of noise frequencies. The center-of-power frequency of each received pulse is doppler shifted from the center frequency of each transmitted exploratory pulse by an amount which depends both on the ground-track velocity of the aircraft and the angular orientation of the transmitted beam with respect to ground. Furthermore, at least in certain cases, it is desirable to operate the radar system in a search mode in which the radar antenna scans back and forth in azimuth with respect to the heading of the aircraft until a moving ground target is detected, and then switches to a track mode in which this detected moving ground target is tracked by the radar antenna. The movement of the radar antenna with respect to the aircraft in both the search and track modes further complicates the spectrum of the received pulses of wave energy and exacerbates the already difficult problems in detecting a moving ground target.

The present invention is directed to a solution of these problems. In particular, the present invention is embodied in a radar system located on a first body moving at a relatively high velocity with respect to a second body which is spaced a distance from the first body, in which the receiver of the radar system includes means for detecting moving targets located on the second body within the illuminated spot thereof, these moving targets including those having a radar cross section size many orders of magnitude smaller than the size of the illuminated spot and moving with respect to the second body at a velocity which is more than an order of magnitude smaller than the velocity between the first and second bodies. In a preferred embodiment of the present invention, the detecting means detects moving targets which move with respect to the second body at a velocity which is at least 100 times smaller than the velocity between the first and second bodies. Further, the detecting means in the preferred embodiment detect moving targets on the second body having a dimension at least one hundred thousand times smaller than the size of the illuminated spot.

These and other features and advantages of the present invention will become more apparent from the following detailed description taken together with the accompanying drawing, in which:

FIG. 2 illustrates a block diagram of a preferred embodiment of an airborne radar system for detecting moving targets on the ground;

FIG. 5 is a block diagram of a preferred embodiment of the parallel range-gated filters and threshold detectors of FIG. 3, and FIG. 6 is a preferred embodiment of each of the range channels of FIG. 5.

Figure 1:
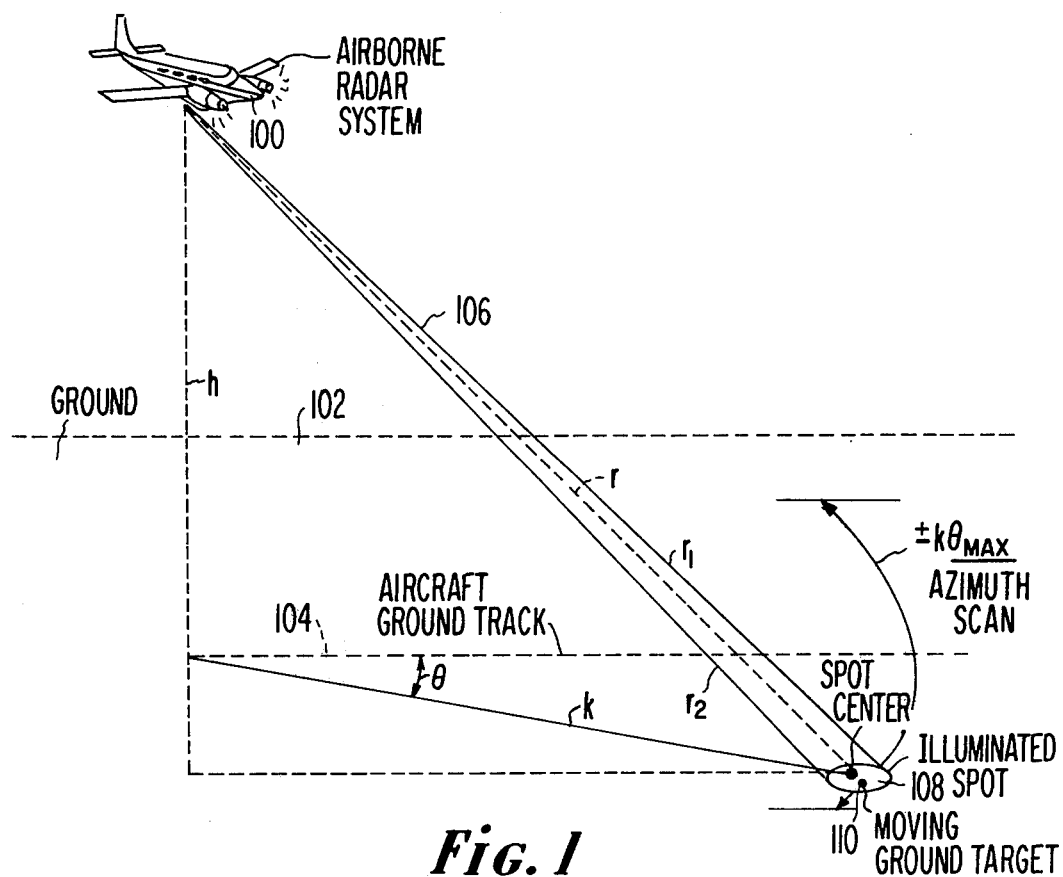
FIG. 1 illustrates the spatial relationship between an airborne radar system and a moving target on the ground in accordance with a preferred embodiment of the present invention.

Referring to FIG. 1, there is shown an airborne radar system aboard aircraft 100. Aircraft 100 is flying at a height $h$ above ground 102 in a direction with respect to the ground indicated by aircraft ground track 104. The radar system transmits a beam of wave energy 106 to the ground in a generally forward direction with respect to the heading of aircraft 100. Beam 106, at a given instant of time, illuminates spot 108 of ground 102. As indicated, the distance between aircraft 100 and the center of illuminated spot 108 is slant range $r$. Although illuminated spot 108 could coincide with aircraft ground track 104, in general, illuminated spot 108 is disposed at some azimuth angle $\theta$ with respect to ground track 104, as shown in FIG. 1. Further, beam 106 may be scanned back and forth in azimuth to a maximum angle $\theta_{max}$ on either side of ground track 104 at a rate sufficiently fast for the radar system to cover the entire area of respective ground strips on either side of aircraft ground track 104 having a width $k\theta_{max}$, where $k$ is the ground projection of slant range $r$, as aircraft 100 continues to fly over ground 102 along ground track 104.

By way of example, the altitude $h$ may be about 15,000 feet; the slant range $r$ may be about 60,000 feet and the maximum scan angle $\theta_{max}$ with respect to aircraft ground track 104 may be ±30° in azimuth, i.e., a total scan angle of 60°. Beam 106 may scan in azimuth at a rate of one full 60° scan per second. Under these conditions, the dimensions of illuminated spot 108 will be about 2 nautical miles or 12,000 feet, so that the area of illuminated spot is in the order of 100,000,000 square feet, more or less. At any given instant, illuminated spot 108 may have none, one or more moving ground targets, such as moving ground target 110, within the illuminated spot area thereof. However, the size of the radar cross section of such a moving ground target is relatively microscopic compared to the overall size of the area of the illuminated spot. For instance, the radar cross section of a moving ground target may be as low as 60 square feet, which is insignificant compared to the overall area, in the order of 100,000,000 square feet, of illuminated spot 108. Even a relatively large moving ground target having an area of 600 square feet would be more than 100,000 times smaller than the area of illuminated spot 108.

The airborne radar system aboard aircraft 100 receives a pulse of reflected wave energy from illuminated spot 108 in response to the illumination thereof with a transmitted exploratory pulse of wave energy from the airborne system. Even when the width of this transmitted exploratory pulse is very short, such as 0.1 $\mu$s, the width of the received reflected pulse of wave energy is quite long, such as about 20 $\mu$s. This is due to the fact that the slant range $r_1$ to the leading edge of illuminated spot 108 exceeds the slant range $r_2$ to the lagging edge thereof by about 2 nautical miles. Furthermore, although an exploratory pulse is a burst of a predetermined frequency, the pulse of reflected wave energy comprises a wide spectrum of noise frequencies, resulting from the reflected ground clutter from all objects (both stationary and moving) within illuminated spot 108.

Each individual one of these ground objects reflects wave energy which is doppler shifted with respect to the illuminating wave energy impinging thereon by an amount which depends on the ground track velocity of aircraft 100, the ground velocity (if any) of that illuminated object, and both the elevation and azimuth angle of that object at that instant of time. The elevation angle, with respect to the heading of aircraft 100, varies from a minimum value for slant range $r_1$ to a maximum value for slant range $r_2$. The azimuth angle, besides being offset by the then-existing value of angle $\theta$, varies with the then-existing width in the azimuthal direction of illuminated spot 108. It is for these reasons that the frequency spectrum of each pulse of received reflected wave energy is relatively wide. Also, the center-of-power frequency of the frequency spectrum of each pulse is offset from the predetermined transmitted frequency of each exploratory pulse by a variable amount which depends on the mean doppler shift of all the ground objects, both moving and stationary, within illuminated spot 108 with respect to the airborne radar system.

The only way for discriminating between moving ground targets and stationary ground objects utilizing doppler techniques is by detecting a relative difference in doppler shift therebetween. Specifically, a moving ground target occupying a particular point within the illuminated spot reflects wave energy at a certain frequency which differs from the frequency which would be reflected from that same point if it were occupied by a stationary object, the amount of such a difference depending upon the veloicty of the moving ground target. On the other hand, a stationary object located at some other point of illuminated spot 108 may reflect wave energy of the same certain frequency as does a moving ground target at the first-mentioned point, if the case is such that the range and angle of illumination of these two points provides a difference in doppler shift between stationary objects situated at the two respective points which happens to be just equal to the relative difference in doppler shift between a moving ground target and a stationary object at the first-mentioned point.

It is desired to detect moving ground targets that are moving at relatively small velocities with respect to the ground velocity of aircraft 100. For instance, slow-moving ground targets, having ground velocities as slow as 5 nautical miles per hour and, perhaps, even 3.6 nautical miles per hour are to be detectable with an airborne radar system aboard an aircraft traveling at a ground velocity of at least 200 nautical miles per hour and, perhaps, 360 nautical miles per hour. Thus, the airborne radar system must be able to detect moving ground targets, and discriminate between moving ground targets and stationary ground objects, when the moving ground targets includes those having ground velocities at least 100 times smaller than the ground velocity of the aircraft carrying the airborne radar system. Further, this must be achieved under the circumstances described above (where each pulse of reflected wave energy includes a wide frequency spectrum of clutter; has its power centered about a frequency which is offset from the transmitted frequency by a variable amount which corresponds to the mean doppler shift, and the relative amount of wave energy received from a moving ground target is a tiny portion of the total wave energy received from the entire illuminated spot).

The radar system illustrated in FIGS. 2–6, which is a preferred embodiment of the present invention is capable of operating under these difficult circumstances to detect and indicate moving ground targets (including the slow moving ones discussed above), while the radar system is airborne and is traveling at a relatively high ground velocity with respect to the ground velocity of the moving ground target.

Referring now to FIG. 2, the radar system, as is conventional, includes transmitting means 200 and receiving means 202 which are coupled to antenna means 204 through duplexer 206. Transmitting means 200, in response to a stream of keying pulses applied thereto at a predetermined repetition rate from time generating means 208, applies bursts of wave energy to antenna means 204 through duplexer 206. Antenna means 204 radiates these bursts of wave energy towards the ground as a pencil beam of exploratory pulses. Reflections from the ground are received by antenna means 204 and applied through duplexer 206 to receiving means 202.

For the purposes of the present invention, it is preferred that antenna means 204 be a monopulse antenna means, as indicated in FIG. 2, to provide tracking of a detected target when the radar is in its track mode.

As known in the monopulse radar art, receiver 202 includes three channels which respectively process separate sum (S), horizontal difference ($D_H$), and vertical difference ($D_V$) signals supplied as separate inputs thereto from monopulse antenna means 204 through duplexer 206. While all three of these signals are used for tracking purposes, only the S signal is used for all other purposes.

As shown, receiving means 202 includes a three-channel front end and IF amplifier portion 210, which has the received S, $D_H$ and $D_V$ signals from duplexer 206 applied as inputs thereto. The S output from front end and IF amplifier portion 210 is applied as inputs both to detecting means portion 212 and antenna-search scan control and monopulse tracking means portion 214 over connection 215, while the $D_H$ and $D_V$ outputs therefrom are applied as inputs to only portion 214. The output from detecting means 212 is applied as an input to display means 216, range gate generating means 218 and search-track mode selection 220 over connection 221. Display means 216, which may include a cathode ray display, and detecting means 212 have an antenna azimuth position signal obtained from monopulse antenna means 204 applied as a control input thereto over connection 222. In addition, detecting means 212 has another control input applied thereto from time generating means 208 over connection 223. Range-gate generating means 218 also has a control input applied thereto from time generating an expanded B-scan display, for visually indicating the azimuth of a detected moving ground target with respect to the heading of the aircraft on which the radar is situated.

Figure 3:
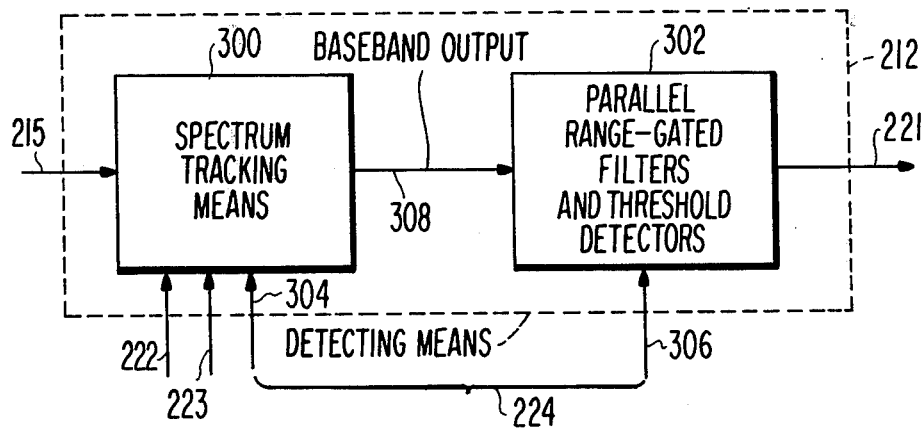
FIG. 3 is a block diagram illustrating the two main components of the detecting means of the radar system shown in FIG. 2.

As shown in FIG. 3, detecting means 212 comprises two main components. These two main components consist of spectrum tracking means 300 and parallel range-gated filters and threshold detectors 302. The IF signal on connection 215 is applied as a signal input to spectrum tracking means 300. Further, the azimuth position signal on connection 222 and the signal from time generating means 208 are applied as control inputs to spectrum tracking means 300. Also, the total range gate is applied as a control input to spectrum tracking means 300 over conductor 304 of connection 224 from range-gate generator 218 and the plurality of the aforesaid separate subinterval range gates are applied to parallel range-gated filter and threshold detectors 302 over the remaining portion 306 of connection 224 to detecting means 212. The output from block 302 appears as the output from detecting means 212 on connection 221.

As will be explained in greater detail in connection with FIG. 4, the output from spectrum tracking means 300, in response to each received pulse of wave energy, is a pulse of baseband energy. The baseband output from spectrum tracking means 300 is applied as an input to parallel range-gated filter and threshold detector 302, which is described in greater detail in FIGS. 5 and 6. The output from block 302, manifesting the detection of only moving ground targets, constitutes the output signal from detecting means 212 which is applied to connection 221.

Figure 4:
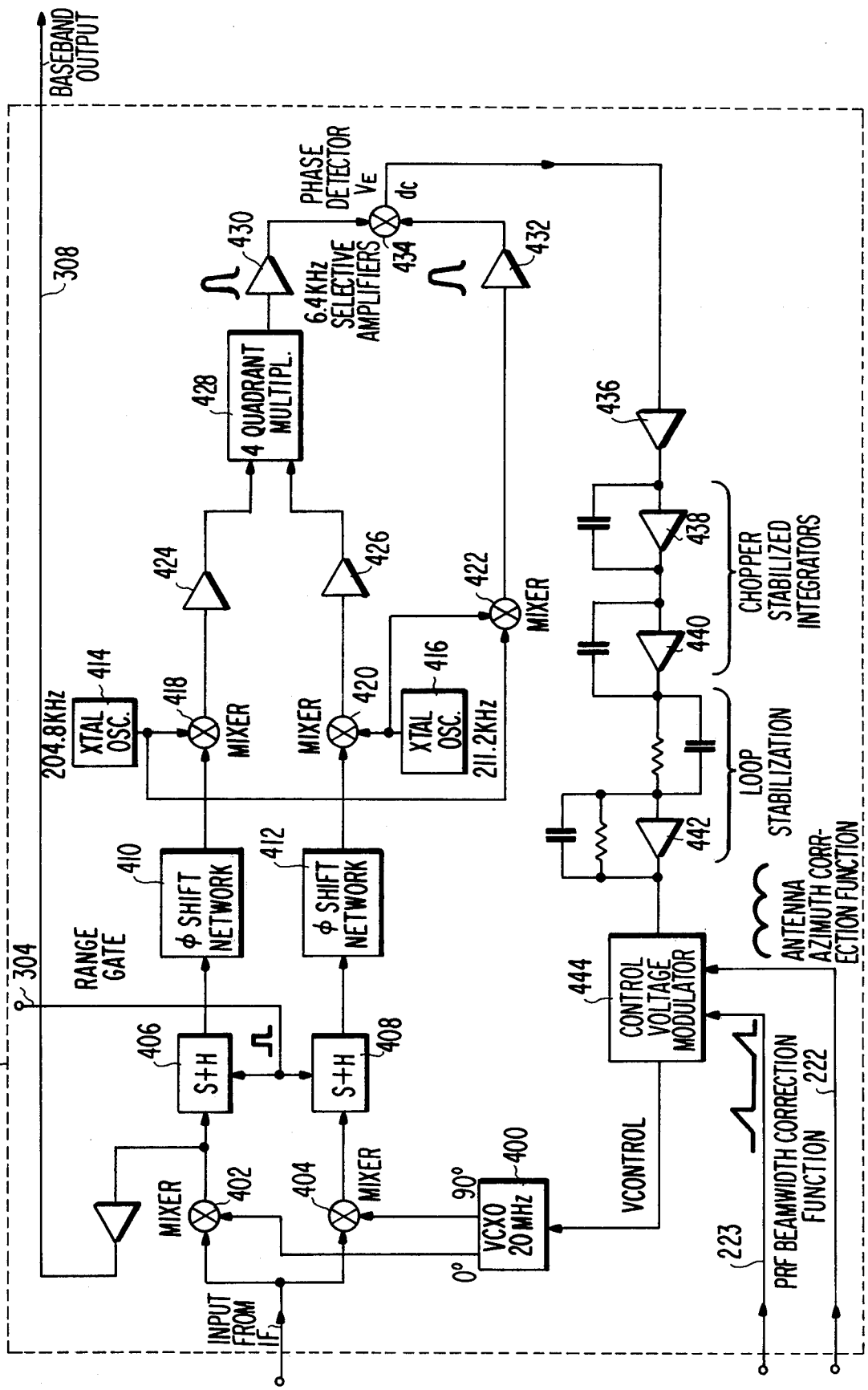
FIG. 4 is a block diagram of a preferred embodiment of the spectrum tracking means of FIG. 3.

As shown in FIG. 4, spectrum tracking means 300 comprises voltage controlled crystal oscillator (VCXO) 400 operating at a nominal frequency of 60 MHz, the same nominal frequency as that of the intermediate frequency present on connection 215 from the output stage of the S channel of front end and IF amplifier 210. VCXO 400 provides two outputs in phase quadrature with respect to each other on the 0° and 90° respective conductors emanating therefrom. Mixers 402 and 404 provide a coherent detector for heterodyning the IF signal input on connection 215 with each of the quadrature outputs of VCXO 400, respectively. The respective pulse outputs from mixers 402 and 404, each consists of a spectrum of energy substantially at baseband. The output of one of these mixers (mixer 402 of FIG. 4), after amplification by wideband video amplifier 406, is applied as the baseband output from spectrum tracking means 300 appearing on connection 308.

The essential problem to be solved by spectrum tracking means 300 is to make the frequency of VCXO 400 follow the center-of-power frequency of each pulse of IF signal applied as an input to mixers 402 and 404 over connection 215 with an error which is negligibly small compared to the relative doppler shift in frequency of the slowest detectable moving ground target at any certain point on the ground with respect to a stationary object at that point. In other words, it is necessary to continuously cancel out the effect of the much larger doppler shift in frequency due to the high velocity of the aircraft itself with respect to the ground. This is achieved by providing spectrum tracking means 300 with a frequency-control loop, shown in FIG. 4, between the output of mixers 402 and 404 and the voltage control input of VCXO 400.

Specifically, this frequency-control loop is composed of sample and hold (S+H) circuits 406 and 408 controlled by the range gate on conductor 304, phase ($\phi$) shift networks 410 and 412, 204.8 KHz and 211.2 KHz crystal oscillators 414 and 416, mixers 418, 420 and 422, 208 KHz tuned amplifiers 424 and 426, four quadrant multiplier 428, 6.4 KHz selective amplifiers 430 and 432, phase detector 434 follower 436, chopper-stabilized integrators 438 and 440, loop-stabilization circuit 442, and control voltage modulator 444 (which has the control inputs on connection means 222 and 223 applied as modulating signals thereto). The output from control voltage modulator 444 is applied to VCXO 400 as the voltage control therefor.

Due to the fact that the signal input to spectrum tracking means 300 on connection 215 is a pulsed signal, this signal in the frequency domain comprises a plurality of spectral lines separated from each other by the value of the pulse repetition frequency. Because this pulsed signal is a noisy signal, each of these lines in itself consists of a relatively narrow band of frequencies similar to random noise, except for the fact that the amplitude thereof has been stabilized by the IF logarithmic/limiting amplifier.

The respective outputs from mixers 402 and 404 contain a pulsed audio frequency spectrum in relative phase-quadrature having mean values determined by the then-existing difference between the frequency of VCXO 400 and the center-of-power IF frequency of the input pulses present on connection 215. Sample and hold circuits 406 and 408, sampling during each total receiver range gate, which occur at the pulse repetition frequency rate, convert the respective phase-quadrature audio frequency pulses present at the outputs from mixers 402 and 404 into continuous-wave (CW) quadrature audio signals, each with an amplitude independent of the pulse repetition frequency duty cycle and a spectral width considerably less than the pulse spectrum of the sampled pulse input.

Phase shift networks 410 and 412, which have a bandwidth from 10 Hz to 10 KHz, operate to phase shift the output from one of sample and hold circuit 406 and 408 by an amount 90° more than the other. The respective outputs of phase shift networks 410 and 412 consist of two signals, which are either in phase or out of phase with each other, depending on whether the frequency of VCXO 400 is then above or below the input signal frequency.

At this point, the pair of signals from phase shift networks 410 and 412 could be applied to a multiplier which would mathematically square the signals and thus produce a DC component with a polarity indicative of the direction of the error frequency of VCXO 400 with respect to the center-of-power frequency of the input signal. For practical reasons, such as voltage offset, filtering of low frequency components of the signal, etc.; a frequency offset method is employed in FIG. 4, which performs the multiplication function without producing the above mentioned undesirable effects. This indirect method also facilitates the addition of "track" and "signal loss" monitoring circuits, if these are desired.

The audio output of phase shift network 419 is heterodyned against the 204.8 KHz output of crystal oscillator 414 in mixer 418 and the audio output of phase shift network 412 is heterodyned against the 211.2 KHz output of crystal oscillator 416 in mixer 420. The respective outputs of mixers 418 and 420, after being means 208 and has its output applied back as a control input to detecting means 212 over connection 224. Search-track mode selector 220 alternatively applies either a search or a track control input to antenna-search scan control and monopulse tracking means 214 over the appropriate one of connections 225 and 226. The output from antenna-search scan control and monopulse tracking means is applied as an antenna azimuth elevation control signal to the antenna steering portion of monopulse means 204 over conductor 227.

In the particular embodiment of the radar system, shown in FIG. 2, which was actually built, transmitting means 200, included a magnetron which generated, when keyed, pulses of wave energy in the Ku band. This wave energy was transmitted as a beam of exploratory pulses by antenna means 204. In this particular embodiment front end and IF amplifier portion 210 consisted of a three-channel, double superhetrodyne with the first local oscillator operating at a frequency in the Ku band which was 60 megacycles above the frequency generated by the magnetron of transmitting means 200, thereby deriving a first IF at a nominal value of 60 MHz for each of the three channels. A small portion of the magnetron power of transmitting means 200 is fed directly to front end and IF amplifier 210 over connection 228. This small portion of magnetron power is used for two purposes. First, it is fed into an AFC circuit used to maintain the frequency of the first local oscillator 60 MHz above the magnetron frequency, despite long-term frequency drift of the magnetron. Second, it is mixed with the first local oscillator signal to provide a pulse signal that is used to phase lock a coherent oscillator (COHO) each time the magnetron transmits a pulse. The oscillation of the COHO is interrupted just prior to each transmitted pulse and restarted in phase and frequency with the transmitted pulse. The nominal COHO frequency is also 60 MHz.

The second local oscillator signal is at 40 MHz and is derived by heterodyning the 60 MHz COHO signal with that of a crystal oscillator at 20 MHz, to thereby provide a second IF at a nominal value of 20 MHz for each of the three channels. The second IF amplifier for each of the three channels, operating at a nominal value of 20 MHz, is a logarithmic amplifier, so that the amplitude of the S, $D_H$ and $D_V$ output signals from the last stage of the second IF amplifier of each of the three channels is stabilized by the logarithmic IF characteristic thereof.

The respective S, $D_H$ and $D_V$ outputs of front end and IF amplifier 210 are all supplied as inputs to antenna search-scan control and monopulse tracking means 214. Tracking means 214, when in its tracking mode, employs these three signals in a conventional manner to provide azimuth and elevation servo control signals to the antenna steering portion of monopulse antenna means 204 over connection 227 to cause the monopulse antenna to track a detected target in a manner known in the monopulse radar art. However, before a target is detected so that it can be tracked, it must first be found. This is accomplished by antenna-search scan control and monopulse tracking means 214, operating in its search mode, together with detecting means 212, range-gate generating means 218 and search-track mode selector 220.

More specifically, means 214, when in its search mode, applies an azimuth scanning control signal to the steering portion of monopulse antenna means 204 over connection 227, which causes the antenna of monopulse antenna means 204 to scan back and forth 30° in azimuth with respect to the heading of the aircraft of which the radar system shown in FIG. 2 is located. The scan range is preferably about one full 60° scan per second.

Detecting means 212 has an IF signal input applied thereto only from the output of the S channel of the second IF amplifier of front end and IF amplifier 210 over connection 215. Detecting means 212, which constitutes the heart of applicant's invention, will be described in detail in connection with FIGS. 3–6. At this time, it is sufficient merely to state that detecting means 212 is capable of detecting a moving ground target occurring within a range gate applied to detecting means 212 from range gate generating means 218 over connection 224.

Range gate generating means 218, as is conventional, has the output from detecting means 212 applied as an input thereto over connection 221 and incorporates means for slewing the range of the range gate until a detected target appears within the range gate. Thereafter, the range of the detected target is tracked in accordance with whether the time of occurrence or output from detecting means 212, indicative of the range of the detected moving target, is early or late with respect to the center of the range gate then being produced by range gate generating means 218. Range gate generating means 218 also includes means operating at the pulse repetition frequency rate for deriving in serial order during each successive pulse repetition period every one of a plurality of separate short subinterval range gates into which a total range gate period has been divided by timing signals applied as a control input to range gate generating means 218 from time generating means 208, as shown in FIG. 2. Connection 224 includes individual conductors for applying both the total range gate itself and each of the separate subinterval range gate portions thereof to detecting means 212. Detecting means 212 also has a timing signal from time generating means 208 applied as a control input thereto over connection 223 and has an azimuth position signal applied as a control input thereto over connection 222 for reasons which will become apparent when detecting means 212 is discussed in detail below.

Output from detecting means 212 is also applied over connection 221 as an input to search-track mode selector 220 which, up to this time, is maintaining antenna-search scan control and monopulse connecting means 214 in its search mode by applying a control input thereto over search conductor 225. However, in response to an appropriate output signal from detecting means 212 being applied thereto, search-track mode selection 220 switches means 214 from its search mode to its track mode. As is known in the monopulse radar art, in order to prevent search-track mode selector from operating in response to a spurious signal from detecting means 212, the appropriate output from detecting means 212 to operate search-track mode selector 220 may require the consecutive detection of two or more successive returns from a moving ground target.

The output from detecting means 212 appearing on connection 221 is further applied as an input to display means 216, which also has the azimuth position signal on connection 222 applied as a second input thereto. Display means 216, may include a cathode ray tube display, such as a PPI display, a B-scan display and/or respectively amplified by 208 KHz tuned amplifiers 424 and 426, are multiplied by four-quadrant multiplier 428. The output from four-quadrant multiplier 428 is a 6.4 KHz signal which jumps 180° in phase whenever the frequency of VCXO 400 crosses through the IF signal frequency present on connection 215.

Phase detector 434 compares the phase of the 6.4 KHz output from multipier 428, after amplification by selective amplifier 430, with the phase of a reference 6.4 KHz signal at the output of mixer 422, after amplification by selective amplifier 432. This reference signal at the output of mixer 422 is obtained by heterodyning the respective outputs of oscillators 414 and 416.

The output from phase detector 434 is a bipolar DC error voltage manifesting the then-existing frequency error with respect to frequency crossover point. After passing through follower 436, employed for isolation purposes, the bipolar DC error voltage is amplified by a pair of chopper-stabilized operational amplifiers 438 and 440, which provide desired second order loop characteristics in conjunction with loop stabilization stage 442.

The amplified error voltage, after being modulated in control voltage modulator 444, is utilized to control the frequency of the VCXO 400 in such a direction as to reduce the frequency difference thereof with respect to the center-of-power frequency of the IF toward zero.

Control voltage modulator 444 modifies the control voltage to correct for inherent radar system errors caused by antenna azimuth angle and instantaneous doppler shift variation as a function of antenna beam depression angle width.

The frequency error of the spectrum tracker, under the dynamic conditions of antenna scan and aircraft speed variation, is in the order of 10 Hz, which enables coherent detection of slow-moving targets on the ground as well as in the air, which are within the antenna beam.

Spectrum tracker 300, as just described, is especially important in the search mode of the radar. The reason for this is that a target must be detected first, before it can be tracked. This requires the highest possible sensitivity, which can only be obtained by coherent processing, i.e. translation of the information from IF to baseband by means of a clutter-reference local oscillator, (VCXO 400 of spectrum tracking means 400), so that the errors produced in this process are negligibly small.

The kinds of errors which can occur in the process consist of (1) random errors due to the statistical nature of th clutter spectrum; (2) dynamic error due to variations of the doppler shift center when the antenna scans in azimuth, and (3) offset error in the amplifiers of the tracking loop.

Because the random error is proportional to the bandwidth of the frequency-control loop of spectrum tracking means 300, this bandwidth should be as small as possible to reduce random error. However, the requirement that dynamic error be kept to a minimum called for a relatively wide bandwidth. A compromise between these conflicting requirements results in the selection of the relatively wide bandwidth about 10 Hz to 50 Hz for the frequency-control loop of spectrum tracking means 300. (Thus, the frequency-control loop is not a strict phaselocked loop, which requires a much narrower bandwidth.) To achieve this relatively wide bandwidth, the open loop gain of the frequency-control loop must be relatively high, necessitating that offset errors, associated with the high gain requirement, be maintained sufficiently small.

Such offset errors are maintained sufficiently small by (1) inserting the sample and hold circuits 406 and 408; and (2) using a frequency offset method achieved by the single sideband modulation of the audio signals on the two carrier frequencies of 204.8 and 211.2 KHz, described above, and (3) the use of chopper-stabilized operational amplifiers to amplify the DC-error signal. The use of sample and hold circuits 406 and 408 increases the open loop gain by a multiple equal to the reciprocal of the square of the duty factor of the pulse clutter echo, without producing offset errors. Typically, this reciprocal has a value of about 100.

Thus, spectrum tracking means 300, of the type disclosed in FIG. 4, results in negligible offset errors and reproduceable frequency-tracking accuracy of performance.

Referring now to FIG. 5, there is shown the details of a preferred embodiment of parallel range-gated filters and threshold detectors 302. In particular, this preferred embodiment of block 302 comprises 240 separate range channels 500–1 . . . 500-240, inclusive. All of these 240 range channels are identical in structure. Specifically, as shown in FIG. 6, each range channel 500 consists of hold circuit 600 having its output connected as an input to a filter 602. Filter 602, in turn, has its output connected as an input to threshold detector 304.

Returning to FIG. 5, the preferred embodiment of parallel range-gated filters and threshold detectors 302 further includes sample and hold steer-in circuit 502 and steer-out circuit 504. Sample and hold steer-in circuit 502 comprises current-amplifiers for amplifying the baseband output from spectrum tracking means 300 applied as a signal input thereto and also comprises a separate normally-closed gate corresponding to each of the 240 range channels. Steer-out circuit 504 also includes a separate normally-closed gate corresponding to each of the 240 range channels.

Connection 306 to block 302 comprises 240 separate conductors, each of which is associated with a respective one of the corresponding gates of sample and hold steer-in circuit 502 and of steer-out circuit 504. Thus, the control input to that individual one of the 240 gates of sample and hold steer-in circuit 502 and the control input to that individual one of the 240 gates of steer-out circuit 504 associated with range channel 500-1 is applied over conductor 506-1 of connection 306. Similarly, the control inputs to each of the corresponding gates of sample and hold steer-in circuit 502 and steer-out circuit 504 associated with range-channel 500-240 is applied over conductor 506-240 of connection 306.

The baseband output from spectrum tracking means 300 consists of a stream of baseband pulses at the radar system pulse repetition frequency rate. Each of these pulses occur during the occurrence of a total range gate present on conductor 304, shown in FIGS. 3 and 4. In the preferred embodiment of the present invention, it is assumed that the pulse repetition frequency is 4 KHz and the width of a total range gate is 24 $\mu$s. The width of the baseband output from spectrum tracking means 300, applied as an input to sample and hold steer-in circuit 502, usually has a duration of about 20 $\mu$s, which is somewhat shorter than the 24 $\mu$s width of a total range gate on connection 304, shown in FIGS. 3 and 4.

In the preferred embodiment of block 302, each of the subinterval portion range gates applied to any of the 240 respective conductors 506-1 . . . 506-240 has a duration of 0.1 μs, i.e. a duration equal to one two hundred fortieth of the 24 μs width of a total range gate. A time interval of 0.1 μs corresponds with a range interval of about 50 feet, while the 24 μs duration of a total range gate corresponds with a range interval of about 12,000 feet.

During the occurrence of each and every range gate, which also occur at a repetition rate of 4 KHz, the 0.1 microsecond subinterval portion range gates are sequentially supplied in serial order to each of conductors 506-1 . . . 506-240. This results in successive 50-foot range-subinterval samples of the baseband pulse output being steered to that particular one of range channels 500-1 . . . 500-240 which corresponds with that particular 50-foot range subinterval. Thus, each of range channels 500-1 . . . 500-240 is dedicated to a separate one of the 240 50-foot range subintervals of the 12,000 feet associated with a total range gate.

As shown in FIG. 6, each sample applied to any range channel is received by hold circuit 600 and held thereby for a pulse repetition period, at which time the next sample is applied thereto.

Filter 602, which filters the signal appearing at the output of hold 600, preferably includes, as a first element thereof, a three-pole high pass filter with a cutoff at 300 Hz. This first element removes a good part of the clutter power within that particular 50-foot range subinterval, but passes any moving ground target signal information therein (assuming that the ground target is moving at a radial velocity of at least 3.6 nautical miles per hour). This first element is preferably followed in order by second and third elements consisting of a notched filter stage centered at 230 Hz and a two-pole high pass filter that cuts off at 300 Hz which together steepen the low-frequency roll-off characteristic below 300 Hz. A gain of 20 dB is preferably incorporated in the notched filter design, which has a Q of 2, that optimizes the roll-off characteristic below 300 Hz. The two-pole high pass filter has a gain of 20 dB.

Filter 602 preferably includes next a fourth element consisting of a 2 kHz three-pole low pass filter, whose primary function is to remove sampling transients and to limit the noise bandwidth. The signals are then preferably divided into two channels composed respectively of fifth and sixth elements of filter 602. The fifth and sixth elements consist respectively of a three-pole high pass filter and a three-pole pass filter both crossing over at 700 Hz.

Threshold detector 604 preferably includes separate detectors for detecting and integrating for 40 milliseconds the output from each of the respective fifth and sixth elements of filter 602. The integrated output from each of these detectors is applied to its own comparator which has its own threshold adjust. However, the outputs from the two comparators are combined into a single logic level, which constitutes the only output from threshold detector 604.

The purpose of this two-channel filter-design approach is to take maximum advantage of the fact that the output of filter 602 covers both the upper band from 700 to 2,000 Hz, which contains only thermal noise that interferes with the signal, and the lower band from 300 to 700 Hz, which must compete with the clutter residue occurring in this region. To avoid false alarms, the thresholds on both channels must adjust differently. For the same false alarm probability in both channels, the probability of target detection is smaller in the lower channel than in the higher channel. The lower channel, however, is necessary to detect a slow-moving ground target. This filter design is based on the clutter width which is generated by a 2° pencil beam at an azimuth of 30° off the flight track (worst case).

At the same time that a new sample is being applied to hold circuit 600 of any range channel, the output from the threshold detector 604 of that range channel is being sampled for a period of 0.1 microseconds by steer-out circuit 504. In this manner, the separate consecutively-occurring output samples from range channels 500-1 . . . 500-240 are reconstituted into the single output appearing on connection 221, which as shown in FIG. 2 is the output from detector means 212.

The function of the parallel range-gated filters and threshold detector 302, just described, is to discriminate between the clutter and target signals as a function of range. Each of the 240 range gated filter channels only observes a 50 foot range interval, and within this range interval it responds only to targets returned with a radial doppler shift of 300 Hz to 2,000 Hz, (corresponding to ground moving targets with a radial velocity of approximately 3.6 to 25 nautical miles per hour). Due to spectrum foldover in a sampled system, it will also respond to radial velocities over 25 nautical miles per hour. Each sample applied to each different one of range channels 500-1 . . . 500-240 contains both the clutter and any moving ground target signal from only a specified 50 foot wide segment of the beam path on the ground. Thus, the clutter power, on average, within any range channel is only about one-two hundred fortieth of the total clutter power present in the applied baseband pulses. However, because of the tiny radar cross section of any ground moving target, the signal power from any moving ground target within any range channel is normally substantially the entire signal power from that particular moving ground target. Therefore, the use of range gated filters increases the signal-to-noise ratio by a factor of substantially 240. For this reason, parallel-range-gated filters and threshold detectors of the type shown in FIG. 5, together with spectrum tracking means of the type shown in FIG. 4, make possible detecting means, of the type shown in FIG. 2, capable of detecting otherwise undetectable, relatively tiny, slow-moving ground targets by means of a radar system aboard a relatively-fast moving aircraft, at a distance of as much as 10 miles or more.

What is claimed is:

1. In a radar system located on a first body moving at a relatively high velocity with respect to a second body which is spaced a distance from said first body, said radar system including transmitting, antenna and receiving means for illuminating a spot of said second body having a first size with a transmitted beam of exploratory pulses of wave energy and receiving reflected wave energy therefrom; the improvement therein in which said receiving means includes means for detecting moving targets located on said second body within said illuminated spot which targets include those having a radar cross section size many orders of magnitude smaller than said first size and moving with respect to said second body at a velocity which is more than an order of magnitude smaller than said relatively high velocity.

2. The radar system defined in claim 1, wherein said detecting means detects moving targets on said second body moving with respect to said second body at a velocity which is at least 40 times smaller than said relatively high velocity.

3. The radar system defined in claim 1, wherein said detecting means detects moving targets on said second body having a radar cross section size at least 100,000 times smaller than said first size.

4. The radar system defined in claim 1, further including means for indicating said detected moving targets.

5. The radar system defined in claim 1, wherein said detecting means includes base-band spectrum tracking means, responsive to each pulse of said received reflected wave energy from said illuminated spot, for deriving as an output the relative frequency spectrum of that pulse at baseband with respect to the center-of-power frequency of that pulse.

6. The radar system defined in claim 5, wherein said receiver means includes range-gate generating means, and wherein said detecting means further includes a predetermined plural number of parallel normally closed range-gated means coupled to said spectrum tracking means for translating the output of said spectrum tracking means through any of said range-gated means only in response to the opening thereof, and control means coupling said range-gate generating means to said range-gated means for sequentially opening each one of said predetermined plural number of range-gated means in turn only during the occurrence of a corresponding one of separate successive contiguous portions of each pulse of said received reflected wave energy from said illuminated spot.

7. The radar system defined in claim 6, wherein any range-gated means is opened for an interval of substantially one-tenth of a microsecond, whereby any one of said portions corresponds to a range interval of substantially 50 feet.

8. The radar system defined in claim 6, wherein any range-gated means includes audio-frequency filtering means for passing audio-frequencies exceeding a given minimum audio frequency corresponding to a moving target on said second body having a minimum detectable velocity with respect to said second body, and a threshold detector having its input coupled to the output of said audio-frequency filtering means for producing an output from said threshold detector only when the amplitude of said input thereto exceeds a given threshold value.

9. The radar system defined in claim 5, wherein said receiver means is a superheterodyne receiver including a given intermediate frequency output stage having a given bandwidth, and wherein said spectrum tracking means includes a voltage-controlled crystal oscillator operating at a frequency within the bandwidth of said output stage, a mixer for heterodyning received pulses appearing at the output of said output stage against the output of said voltage-controlled crystal oscillator to convert the frequency spectrum of said received pulses to substantially baseband at the output of said mixer, and a frequency control loop coupled between said mixer and said voltage-controlled crystal oscillator having resolution and response characteristics sufficient to maintain the error between the frequency of said voltage-controlled crystal oscillator and the center-of-power frequency of received pulses appearing at the output of said output stage at a value no greater than a maximum which is negligible with respect to the frequency associated with any detectable moving target in the frequency spectrum appearing at the output of said mixer, the output of said mixer constituting the output of said spectrum tracking means.

10. The radar system defined in claim 9, wherein said antenna means is moveable with respect to said first body, and said radar system further includes means for cyclically scanning said antenna means through a given azimuth angle at a given scan frequency to thereby scan said illuminated spot across said second body at a rate which depends on the distance between said first and second bodies and the scan frequency, the given azimuth and the elevation angle of said antenna means, and wherein frequency control loop has resolution and response time characteristics sufficient to maintain said error at a value greater than a minimum which is many times said given scan frequency.

11. The radar system defined in claim 10, wherein said given scan frequency is 1 Hertz and said error is between 10 and 20 Hertz.

12. The radar system defined in claim 10, wherein said antenna means includes monopulse antenna means, and wherein said radar system further includes means responsive to said detecting means detecting a moving target while said antenna means is being scanned through said given azimuth angle for terminating said scan and causing said monopulse antenna means to track that detected moving target.

13. The radar system defined in claim 10, wherein said frequency control loop includes modulation means for introducing a controlled variation in the frequency of said voltage-controlled crystal oscillator to compensate for changes in the center-of-power frequency of received pulses due to the scanning of said antenna means through said given azimuth angle at said given scan frequency.

14. The radar system defined in claim 10, wherein said frequency control loop includes range-gated sample and hold circuits having the output pulses from said mixer applied as a pulse input thereto for deriving a continuous signal having a frequency spectrum corresponding with the frequency spectrum of the pulse input thereto except for the removal therefrom of the pulse-repetition frequency components of said pulse input thereto.

15. The radar system defined in claim 1, wherein first body is an aircraft and said second body is said earth, wherein said aricraft moves at a velocity of at least 200 knots and said detecting means detects moving targets on the earth which includes those moving at velocities at least as low as 5 knots.

16. The radar system defined in claim 15, wherein said detecting means can detect moving targets having a radar cross section of 60 square feet when the start range from the aircraft to the target is 60,000 feet.

* * * * *